United States Patent
Meksavan et al.

(10) Patent No.: US 6,581,838 B1
(45) Date of Patent: Jun. 24, 2003

(54) OPTICAL SCANNER HEAD FOR PROCESSING BARCODE DATA AND METHOD OF MANUFACTURE

(75) Inventors: Boonphet Meksavan, St. Charles, IL (US); James C. Graves, St. Charles, IL (US); Roman J. Berka, Algonquin, IL (US)

(73) Assignee: iPilot, Inc., Schaumburg, IL (US)

( * ) Notice: Subject to any disclaimer, the term of this patent is extended or adjusted under 35 U.S.C. 154(b) by 0 days.

(21) Appl. No.: 09/699,833

(22) Filed: Oct. 30, 2000

Related U.S. Application Data

(63) Continuation of application No. 09/565,058, filed on May 3, 2000.

(51) Int. Cl.⁷ ................................................. G06K 7/10
(52) U.S. Cl. ........................... 235/462.46; 235/462.43; 235/462.49; 235/472.03; 235/472.02
(58) Field of Search ............................ 235/454, 462.01, 235/462.07, 462.45, 462.46, 462.49, 472.01, 472.02, 472.03, 462.43

(56) References Cited

U.S. PATENT DOCUMENTS

| | | | | |
|---|---|---|---|---|
| 4,465,926 A | | 8/1984 | Apitz et al. | 235/462.49 |
| 4,793,812 A | | 12/1988 | Sussman et al. | 434/116 |
| 4,816,659 A | * | 3/1989 | Bianco et al. | 235/454 X |
| 4,866,258 A | * | 9/1989 | Ueda et al. | 235/462.49 |
| 4,899,370 A | * | 2/1990 | Kameo et al. | 379/102.03 |
| 4,945,216 A | * | 7/1990 | Tanabe et al. | 235/462.46 X |
| 5,047,615 A | * | 9/1991 | Fukumoto et al. | 235/472.01 X |
| 5,099,109 A | * | 3/1992 | Ishikawa et al. | 235/462.49 X |
| 5,278,397 A | * | 1/1994 | Barkan et al. | 235/462.49 |
| 5,481,098 A | | 1/1996 | Davis et al. | 235/462.09 |
| 5,656,805 A | | 8/1997 | Plesko | 235/472.03 |
| 6,112,992 A | | 9/2000 | Agabra et al. | 235/462.25 |
| 6,119,938 A | * | 9/2000 | Agabra et al. | 235/454 |
| 6,119,944 A | | 9/2000 | Mulla et al. | 235/472.03 |

FOREIGN PATENT DOCUMENTS

JP        4-358466 A   * 12/1992

* cited by examiner

*Primary Examiner*—Michael G. Lee
*Assistant Examiner*—Jared J. Fureman
(74) *Attorney, Agent, or Firm*—Howrey, Simon, Arnold & White, LLP

(57) ABSTRACT

A barcode scanning head includes a body portion having a first pathway for discharging light and a second pathway to receive light. The second pathway is disposed at an angle from the first pathway to form a fixed focal point position in front of the scanning head.

24 Claims, 11 Drawing Sheets

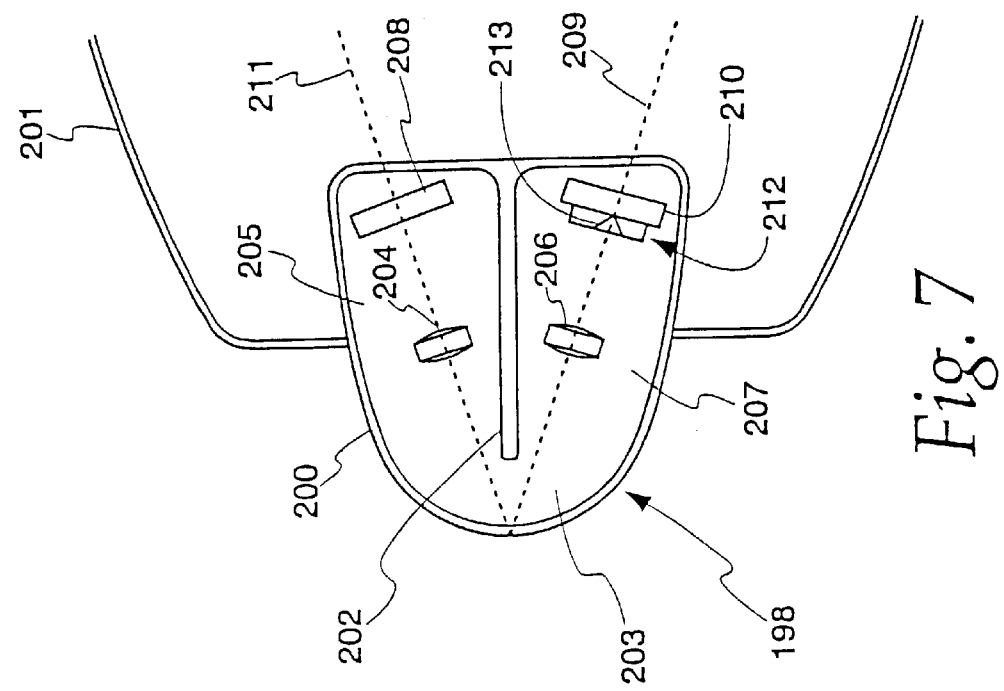
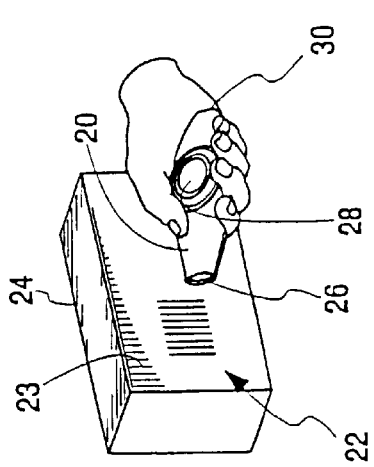
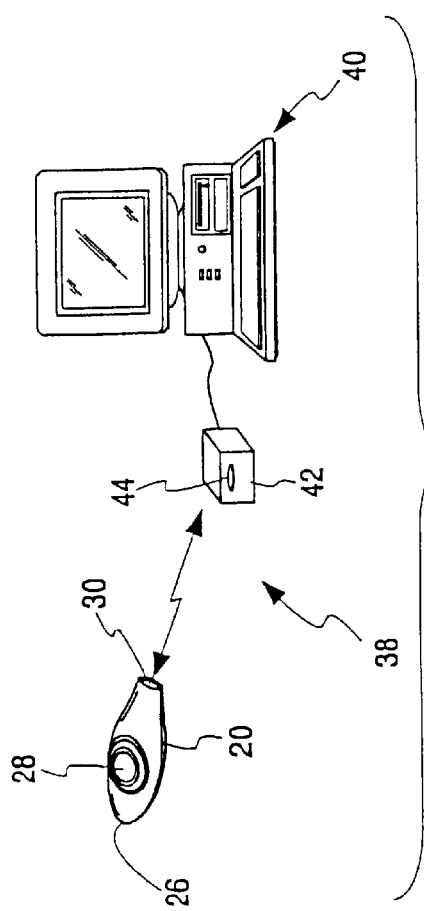

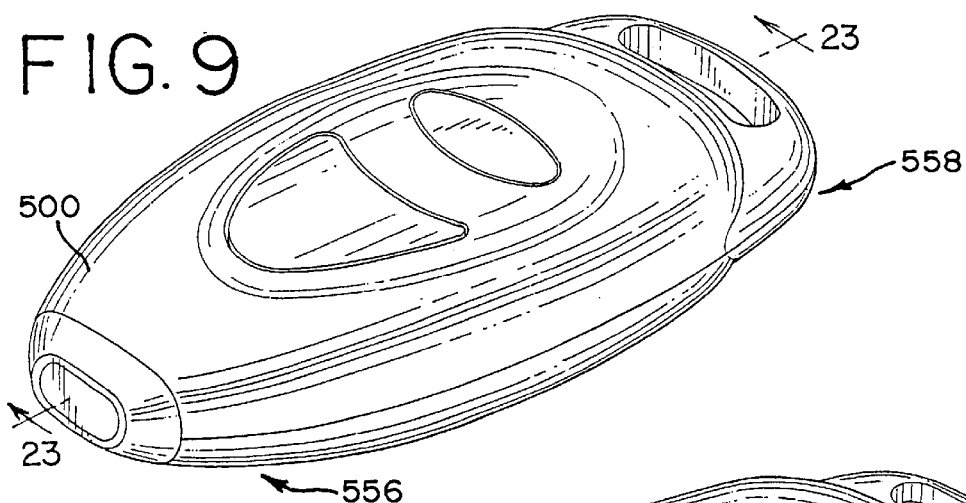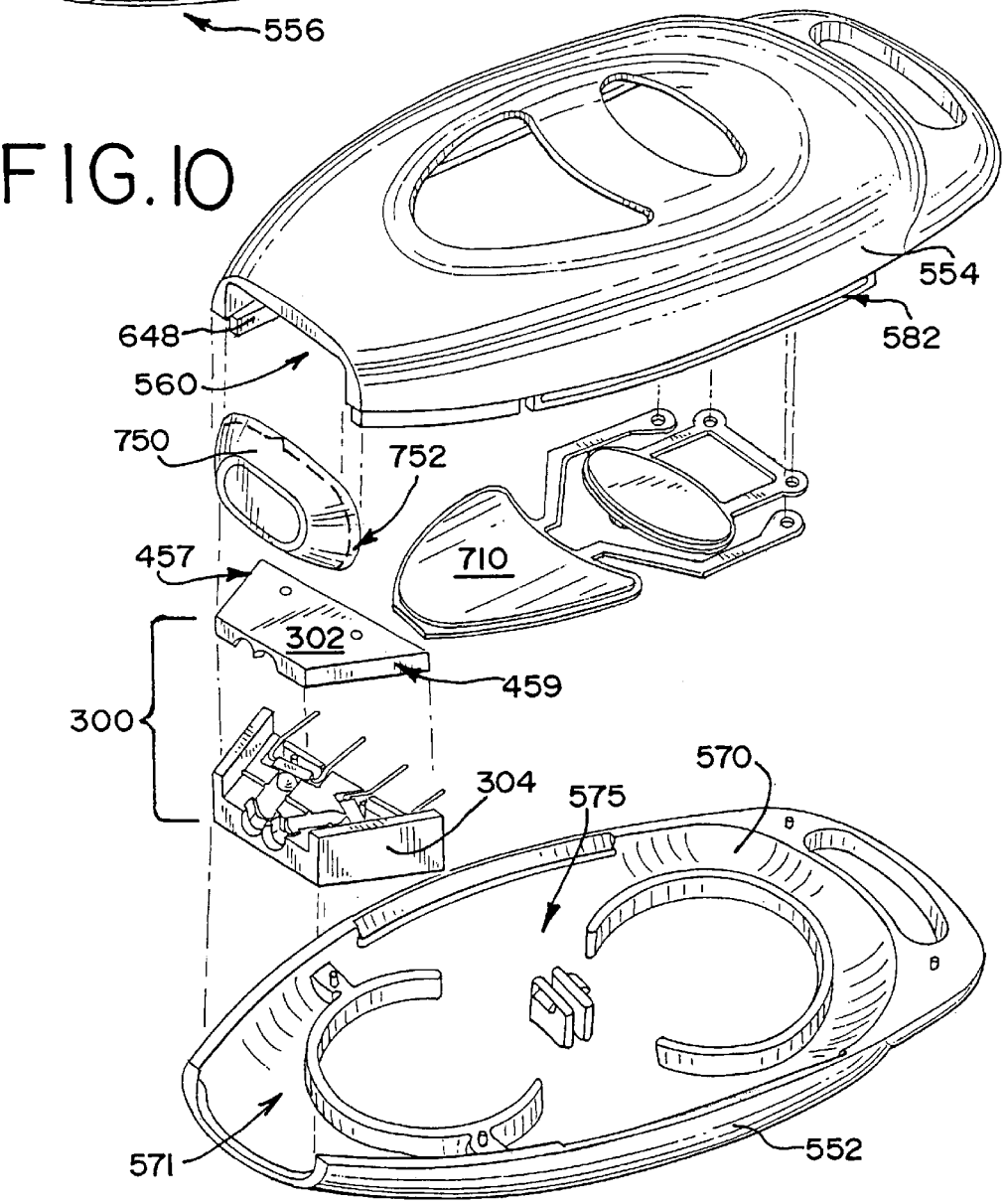

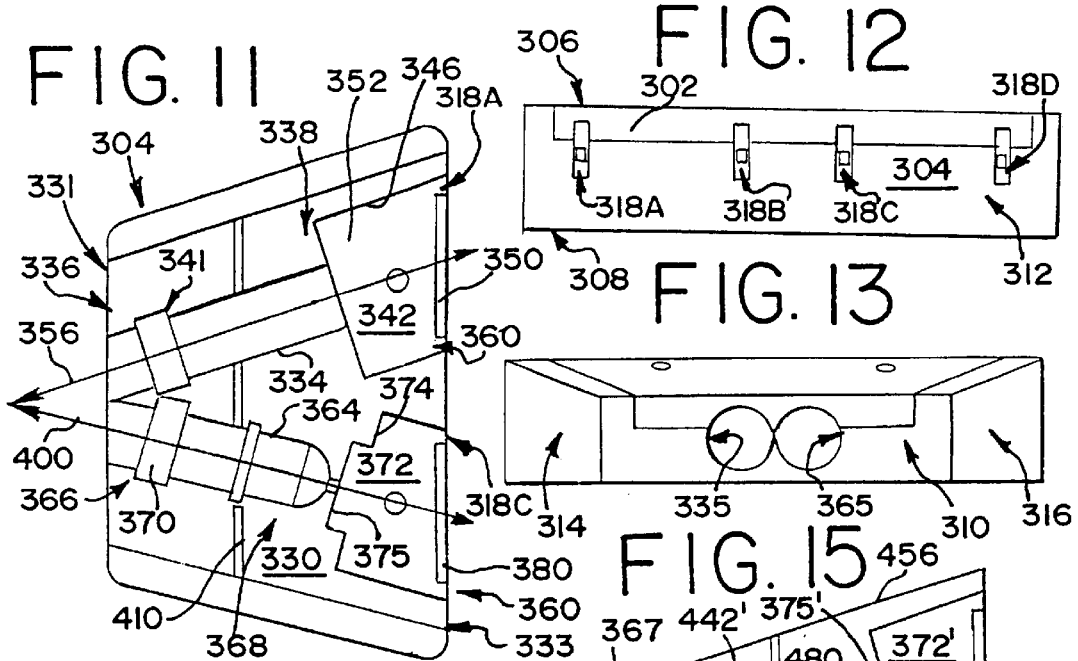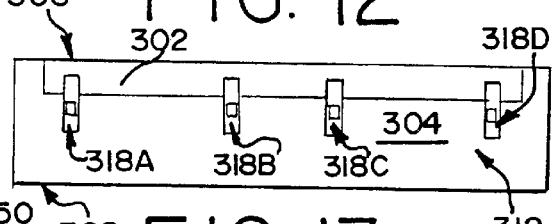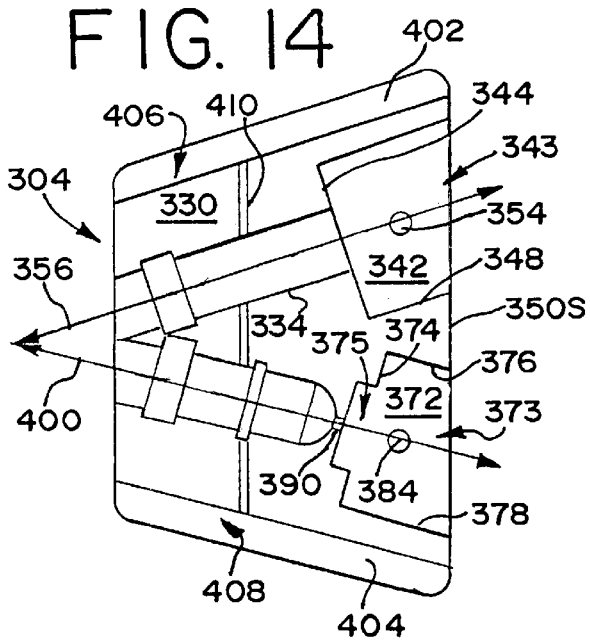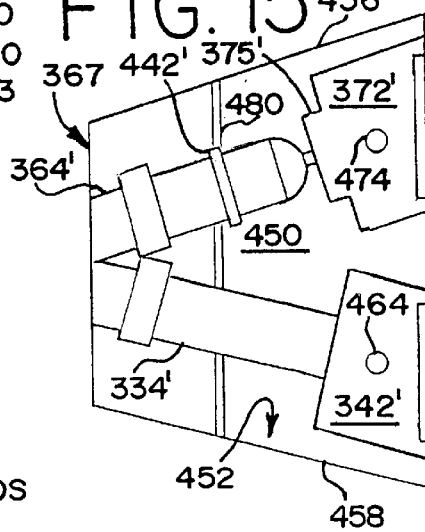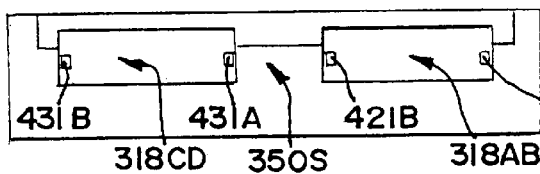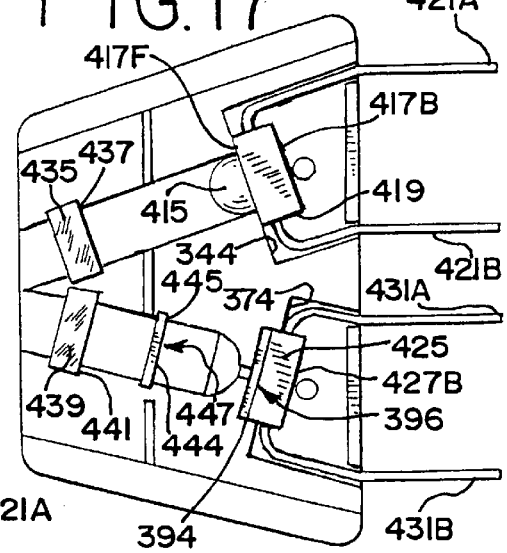

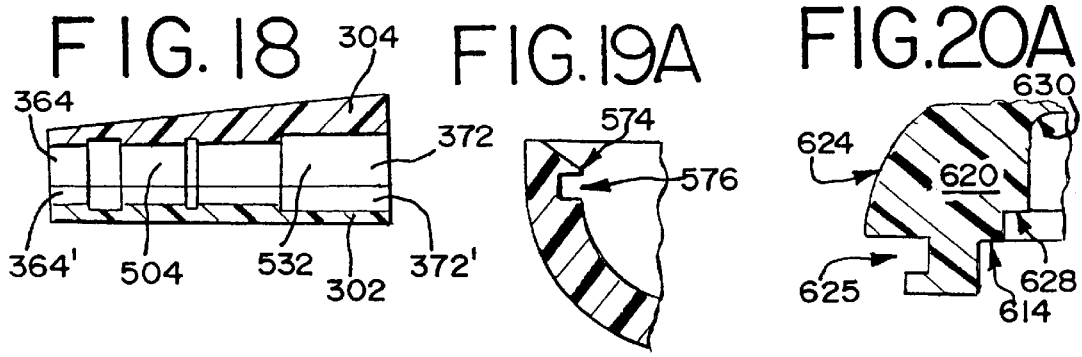
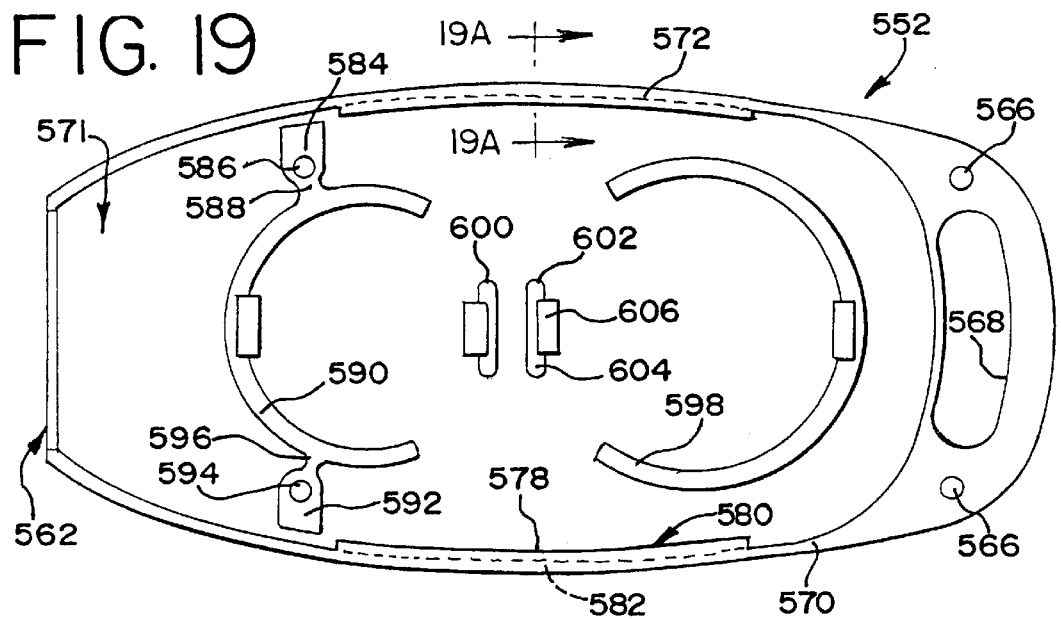
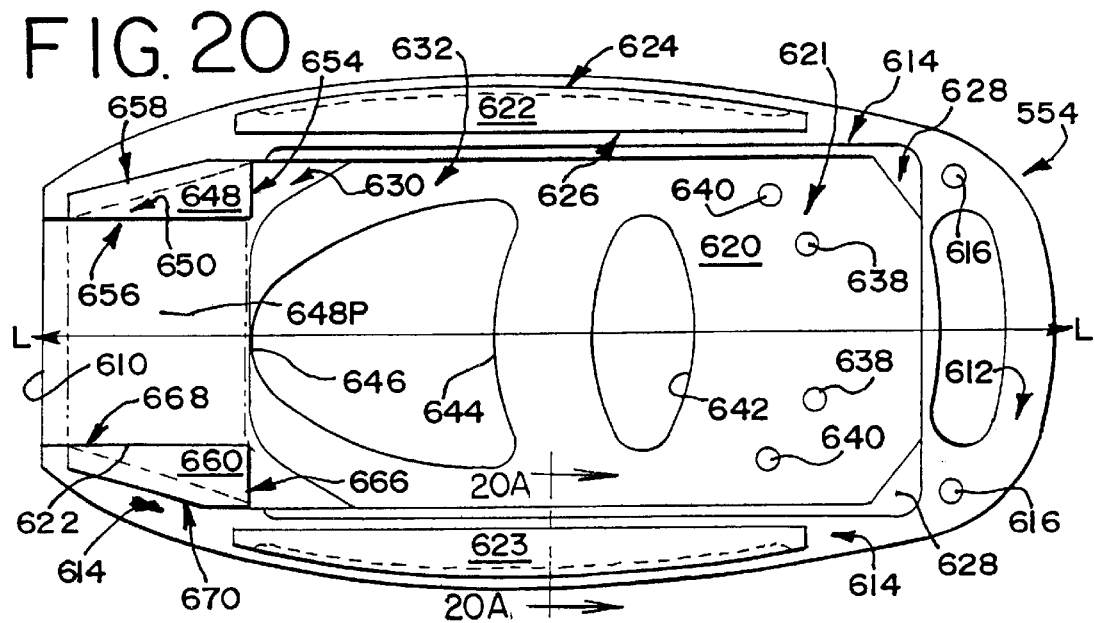

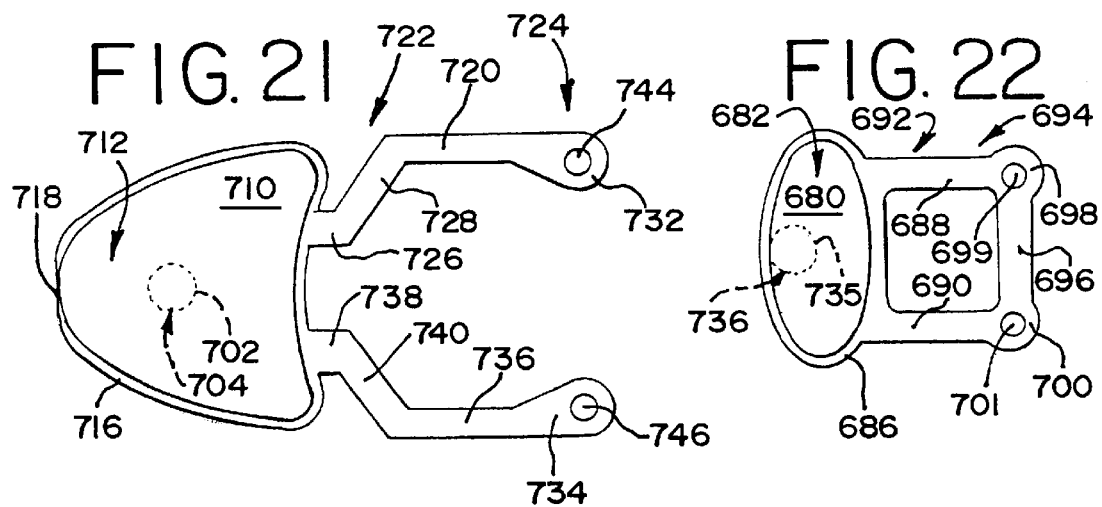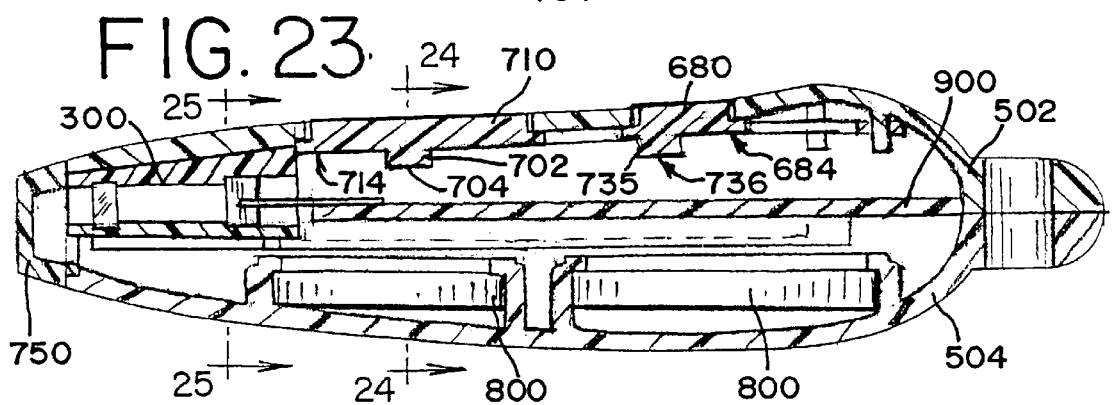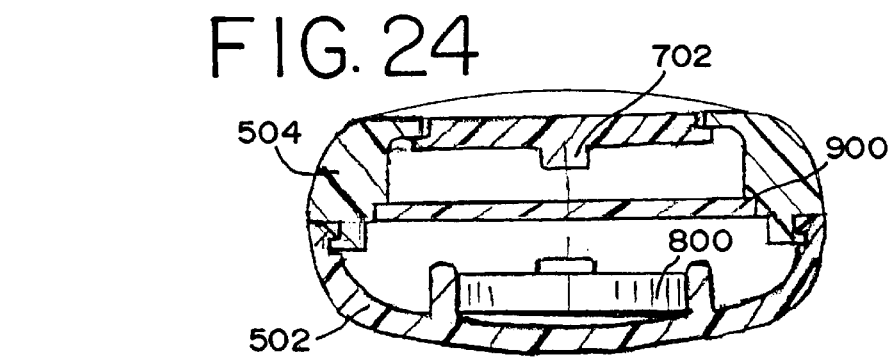

OPTICAL SCANNER HEAD FOR PROCESSING BARCODE DATA AND METHOD OF MANUFACTURE

CROSS REFERENCES TO RELATED APPLICATIONS

This application is a continuation of U.S. Ser. No. 09/565,058, filed on May 3, 2000.

TECHNICAL FIELD OF THE INVENTION

The invention relates generally to optical scanners, and in particular to a hand-held optical scanner device for reading and transmitting barcode data and a mass-produced, low-cost optical scanner head for use in the scanner device.

BACKGROUND OF THE INVENTION

Optical scanning systems have been developed for reading indicia such as barcode symbols appearing on labels or on the surfaces of articles. Typically, these systems include a laser scanning device or charge coupled device (CCD) scanner for reading barcodes.

Many laser and CCD scanners are relatively expensive to manufacture. One of the factors contributing to the manufacturing expense is that the light focusing lenses used within such devices are high precision glass lenses. The precision of the glass lenses is critical to proper performance of the scanner device. Furthermore, these precision lenses also require machined housings for precisely maintaining critical optical axes and focusing distances. These factors lead to high manufacturing costs.

BRIEF DESCRIPTION OF THE DRAWINGS

The invention is pointed out with particularity in the appended claims. The drawings and detailed description which follow are merely illustrative of the invention, rather than limiting. The scope of the invention is defined by the appended claims and equivalents thereof. Accordingly:

FIG. 1 illustrates an optical barcode scanner for reading a barcode symbol in accordance with an embodiment of the present invention;

FIG. 2 illustrates a system, in accordance with the present invention, for transmitting scanned barcode data to a host;

FIG. 7 is a partial top sectional view of the optical head included in the optical scanner of FIGS. 1–3;

FIG. 9 is a perspective view of a second embodiment of the hand-held barcode scanner illustrated in FIGS. 1–2;

FIG. 10 is an exploded perspective view of the hand-held barcode scanner shown in FIG. 9;

FIG. 11 is a top plan view of a first embodiment of the optical scanner head, includable in the hand-held barcode scanner of FIGS. 9–10;

FIG. 12 is a rear elevational view of the optical scanner head of FIG. 11;

FIG. 13 is a front elevational view of the assembled optical scanner head of FIG. 11;

FIG. 14 is a top plan view of a second embodiment of the optical scanner head, includable in the barcode scanner of FIGS. 9–10;

FIG. 15 is a plan view of a lid portion of the optical scanner head shown in FIG. 12 detailing the interior side;

FIG. 16 is a rear plan view of the assembled optical scanner head shown in FIG. 14;

FIG. 17 is a top plan view of the body portion of the optical scanner head of FIG. 11 with the photoemitter and photodetector assemblies inserted therein;

FIG. 18 is an elevational view in cross-section through an optical pathway of the optical scanner head shown in FIG. 11;

FIG. 19 is a top plan view of a bottom piece of the scanner housing of the hand-held scanner of FIG. 9;

FIG. 19A is a front elevational view in cross-section taken along line 19A—19A of the scanner housing of FIG. 19;

FIG. 20 is a top plan view of a top piece of the scanner housing of the hand-held scanner in FIG. 9;

FIG. 20A is a front elevational view in cross-section taken along line 20A—20A of FIG. 20;

FIG. 21 is a top plan view of a first control button used with the hand-held scanner shown in FIGS. 9–10;

FIG. 22 is top plan view of a second control button used with the hand-held scanner shown in FIGS. 9–10;

FIG. 23 is an elevational view in cross-section of the assembled hand-held barcode scanner of FIG. 9; and FIG. 24 is a front elevational view in cross-section of the. hand-held scanner of FIG. 9 with the optical scanner head removed to highlight the positional relationship between the circuit card and power source when assembled.

DETAILED DESCRIPTION OF THE PRESENTLY PREFERRED EMBODIMENTS

Figure 3:
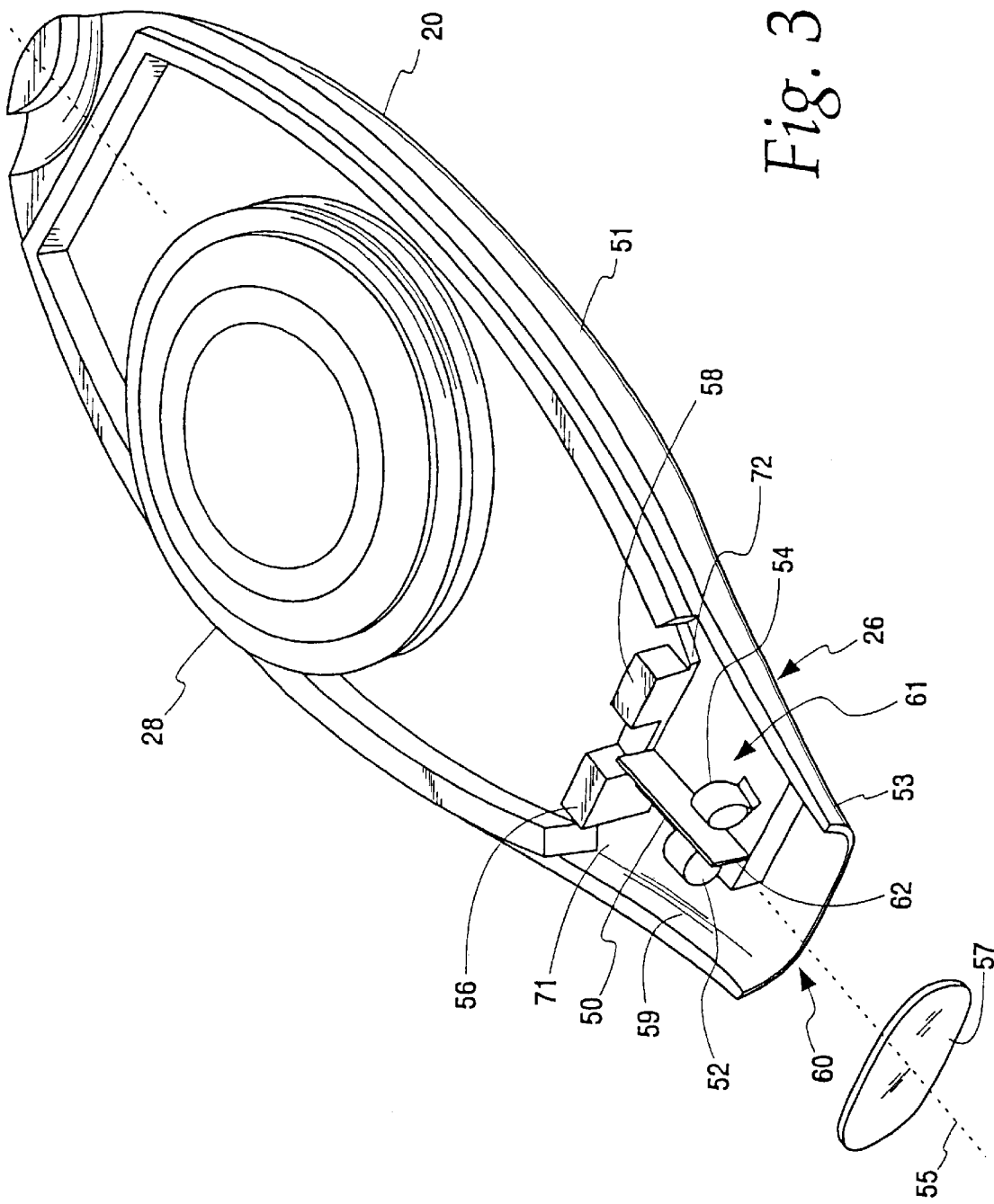
FIG. 3 is a perspective cut-away, partial exploded view of a first embodiment of the hand-held scanner shown in FIGS. 1–2.

Turning now to the drawings, and in particular to FIG. 1, there is shown a hand-held optical scanner 20 for reading a barcode symbol 22 appearing on a scanning surface 23. The scanning surface 23 can be included on an article 24, such as a box, sheet of paper, or included in a publication such as a catalog or magazine displaying advertisements that include a barcode symbol.

The optical scanner 20 includes a scanning head 26 for contacting the scanning surface 23 and reading the barcode symbol 22. The scanner 20 can also include a optical transceiver port 30 for transferring scanned barcode data to other devices by way of a wireless communication path. Barcode data is information encoded by a barcode symbol.

The optical scanner 20 includes a manual operator 28 permitting a user to set the operational mode of the scanner 20. The manual operator 28 can include one or more momentary contact pushbutton switches, which allow a user to control operations of the scanner 20. The manual operator 28 can be used to turn on scanner 20, as well as switch modes of operation between a scan mode and a transmit mode. The operational modes of the scanner 20 are described in further detail below in connection with FIGS. 5–6.

The barcode symbol 22 is read by placing the scanner 20 so that the scanning head 26 is in contact with or in close proximity to the scanning surface 23. The scanning head 26 is then manually swiped over the barcode symbol 22. The scanner 20 can be configured to accurately read barcode symbols when the scanning head 26 is moved over a symbol at a lineal speed between one inch per second and five inches per second.

Different barcode symbologies can be read by the scanner 20. For example, the scanner 20 can read barcode symbols defined according to industry standards, such as the universal product code (UPC), 128, 3 of 9, and the like.

An advantage of the optical scanner 20 is that it is inexpensive to manufacture and provides consumers a low-cost means for scanning barcode data and transferring it to a host device.

FIG. 2 illustrates a system 38 for transferring scanned barcode data from the optical scanner 20 to a host computer 40. The data can be transferred from the optical transceiver port 30 of the scanner 20 to an optical port 42 which is attached to the host computer 40. The optical port 42 can include a photosensitive receiver 44 for receiving and converting optical signals from the scanner 20 into electrical signals for use by the host 40.

The host computer 40 can be a standard workstation or personal computer (PC) running a conventional operating system, such as Unix, Linux, or Windows 98 or NT, or the like. The host 40 can alternatively be implemented using other devices, such as a pager or personal digital assistant (PDA) such as the Palm Pilot available from Palm, Inc. The optical port 42 can be a commercially-available infrared (IR) port for receiving infrared signals and providing them to the host 40 as electrical signals. An exemplar of the optical port 42 is the IR-220 serial dongle available from Actisys, Inc., which attaches to a conventional PC serial port and converts IR signals to standard RS-232 signals.

Although the present invention can be practiced using a radio frequency (RF) wireless link between the scanner 20 and the host 40, an IR communication path is preferably used. The IrDA standard can be employed to transfer data over the air between the optical port 30 and the host optical port 42.

Each barcode transmitted by the scanner 20 is encapsulated into a data packet and then transmitted to the host 40. Each packet is defined by a barcode transmission format, which includes the following fields:
Leader=Three bytes of 0xFF
Cyclic Redundancy Code (CRC)=Two bytes (16-bit unsigned integer)
Type=One byte (ACSII)
Length=One byte (unsigned byte)
Barcode Data=255 bytes The type field is used to identify different types of barcode symbologies representing the scanned barcode data, such as UPC-A, UPC-E, EAN, 128, and 3 of 9.

The CRC can be computed based on the type, length and barcode data fields. As an alternative to a CRC, a checksum can be used instead and computed over the same fields.

For each barcode data packet received, the host 40 generates an acknowledgment (ACK) response that is transmitted back to the scanner 20. The packet format for the ACK response is:
Leader=Three bytes of 0xFF
ACK=One byte (ASCII character)
 "N": Barcode not received correctly
 "D": Received correctly and delete barcode stored at scanner
 "S": Received correctly and save barcode stored at scanner A software program on the host 40 can permit a user to configure the ACK as including either the "D" indication or the "S" indication for successfully transmitted barcodes.

The transmit function of the scanner 20 is described in further detail below in connection with FIG. 6.

FIG. 3 is a perspective partial cut-away diagram of a first embodiment of the optical scanner 20. The scanner 20 includes a housing 51 forming an elongated compartment 62 having a top (cut-away not shown), a bottom 53, and an open end 60 at the scanning head 26 and of the scanner 20.

A transparent window 57 can be fitted over the open end 60 to enclose the compartment 62. A photoemitter 56, such as a commercially-available IR light emitting diode (LED), and a photodetector 58, such as a commercially-available phototransistor, are disposed at one end of the enclosed elongated compartment 62 so that their photosensitive surfaces generally face the open end 60.

The photoemitter 56 can be an IR LED emitting a light beam at a median wavelength of 850 nm, while the photodetector 58 can be an NPN phototransister that is sensitive to light at a wavelength at or near 880 nm.

A wall 50 is located within the compartment 62 and extends along the length of a compartment 62 substantially aligned with the axis 55 of the housing 51. The wall 50 extends from the bottom 53 to the top (not shown cut-away) of the housing 51 to divide the compartment 62 into a first subcompartment 59 and a second subcompartment 61.

The wall can provide a light tight seal in the compartment 62, which limits the amount of extraneous light reaching the photosensitive area 72 of the photodetector 58. This improves the ability of the photodetector 58 to detect contrast transitions occurring as the scanner 20 in moved over a barcode symbol.

An illuminator lens 52 is positioned within the first subcompartment 59 for focusing the light beam emitted by the photoemitter 56 onto a scanning surface coming into contact with the transparent window 57. An imaging lens 54 is positioned within the second subcompartment 61 for focusing light reflected from the scanning surface onto the photodetector 58. Each of the lens can be made from low cost polycarbonate (clear plastic). The lenses 54, 56 can be focused at the same point at or near the contact point of the window 57 with the scanning surface 23. In addition, the lenses 54, 56 can be placed in the compartment so that they are arranged symmetrically about the axis 55 of the housing 51

The partial exploded view shows the transparent window 57 removed from the open end 60. The transparent window 57 can be a clear piece of plastic shaped to cover the open end 60 and contact a scanning surface when the scanner is in use. Alternatively, the window 57 can be made from a material having optical properties that filter undesirable light frequencies and a pass light at those frequencies at which the photoemitter 56 and photodetector 58 operate.

The wall 50 prevents extraneous light, e.g., light not reflected from a barcode symbol from reaching the photodetector 58. This improves the overall reliability with which the optical scanner 20 reads barcode symbols.

FIG. 3 illustrates an embodiment of the present invention where the photosensitive surfaces 71, 72 of the photoemitter 56 and photodetector 58 are not aligned with the optical axes of the illuminator and imaging lenses 52, 54. In an alternative embodiment, the axis of the photoemitter 56 can be aligned with the optical axis of the illuminator lens 52, while the photosensitive area of the photodetector 58 can be aligned so that it is substantially normal to the optical axis of the imaging lens 54.

As will be described in further detail in connection with FIG. 7 herein, a pinhole aperture (not shown in FIG. 3) can be placed in close proximity to the photosensitive area of the photodetector 58 to limit the amount of light reaching the photosensitive area 72.

Figure 4A:
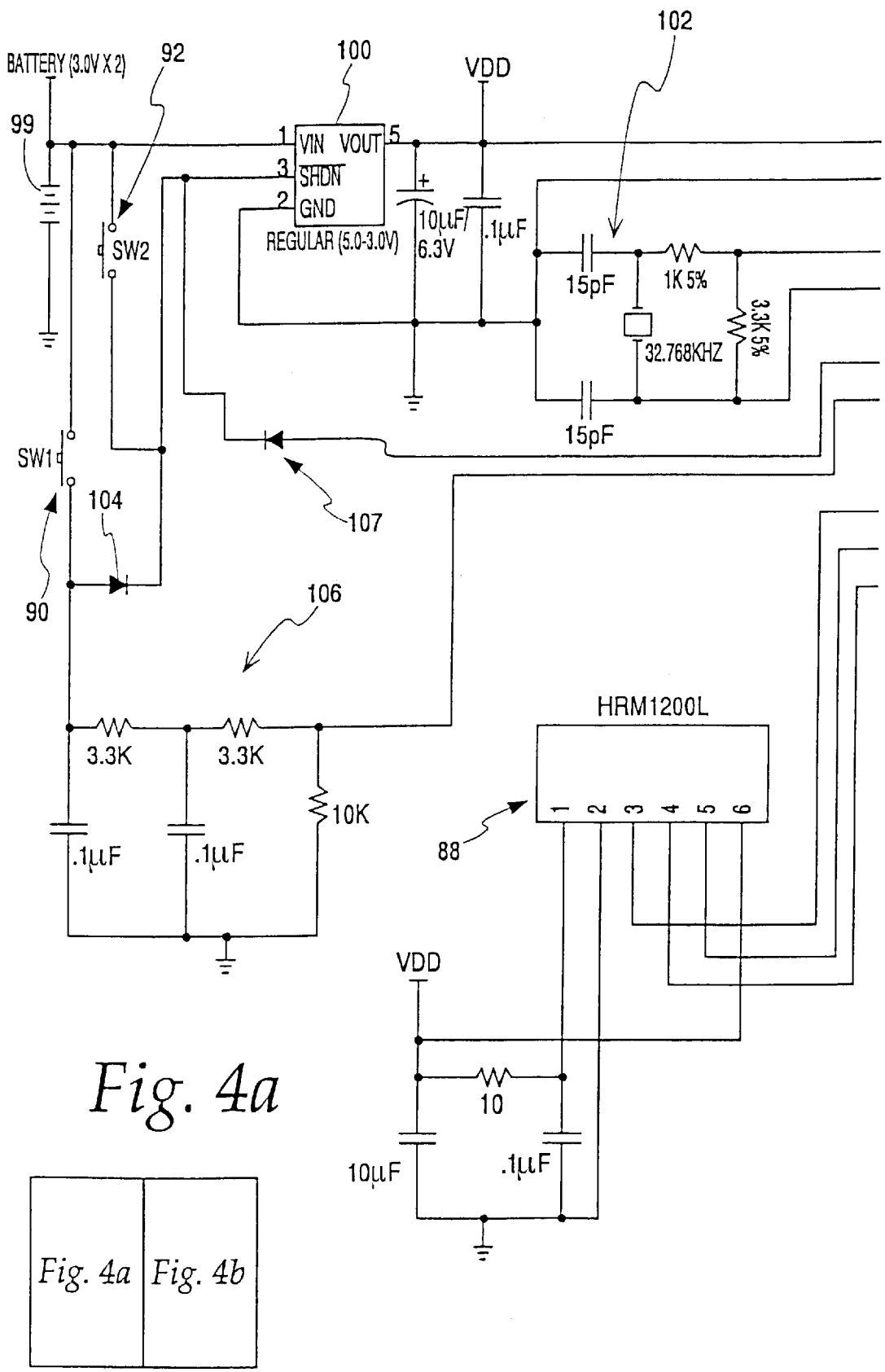
FIGS. 4a–b are schematic diagram of an electronic circuit included in the hand-held optical scanner of FIGS. 1–3.
Figure 4B:
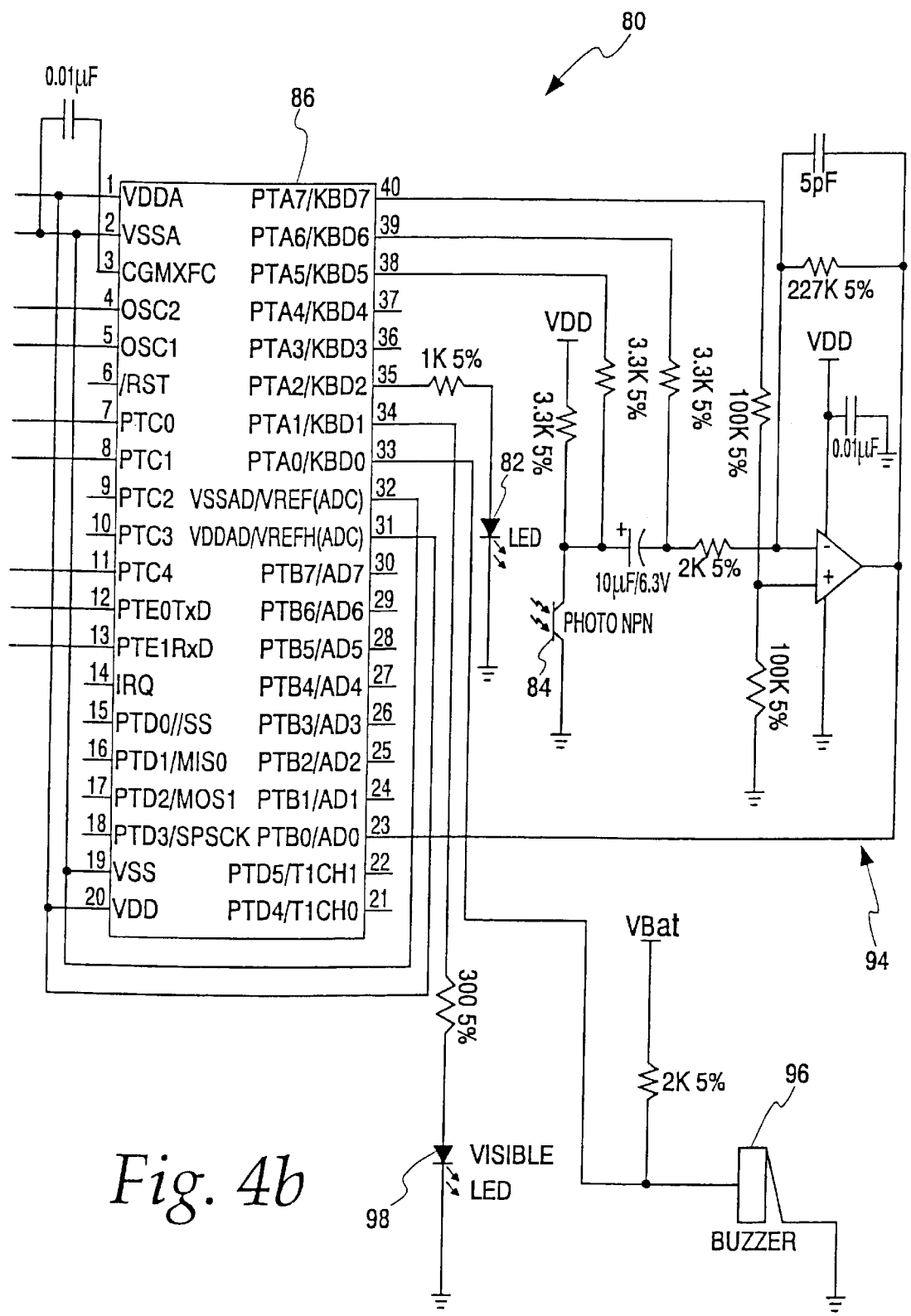

FIGS. 4a–b are schematic diagram of an electronic circuit 80 included in the scanner 20. The circuit 80 includes a processor 86 operating in conjunction with an LED 82, a phototransistor 84, an optical transceiver port 88, and a pair of manually-operated switches 92. The LED 82 can be an IR LED acting as the photoemitter 56 for producing an IR optical beam. The phototransistor 84 acts as the photodetector 58, and is responsive to a wavelength of light emitted by the LED 82.

An amplifier circuit 94 amplifies signals from the phototransistor 84, and then provides the amplified signals as input to the processor 86.

A battery 99 provides power to the circuit 80. The output of the battery is regulated by a voltage regulator 100, which can be a commercially-available voltage regulator for providing 3.0–5.0 voltage output.

An oscillator circuit 102 provides a predetermined clock frequency to the processor 86.

A visible light LED 98 and a buzzer 96 provide visual and audio feedback to a user to indicate the operational status of the scanner 20. Both the LED 98 and buzzer 96 are controlled by the processor 86. The LED 98 can be attached to the housing 51 so that it is visible on the top side of the housing 51. The buzzer 96 can generate tones, under the direction of the processor 86, at different frequencies to indicate the various outcomes of scanner operations. For example, the processor 86 can be programmed to generate different tones or beeps using the buzzer 96 to indicate conditions such as time-out, barcode data memory full, power-on, good scan, bad scan, or the like.

The processor can be any microprocessor or microcontroller programmed and connected to perform the functions as described herein. The schematic shown in FIGS. 4a–b illustrates the use of a particular microprocessor, Part No. MC68HC908GP32, available from Motorola, Inc. As will be discussed below in connection with FIGS. 5–6, the processor 86 is programmed and configured to interact with the various components shown in the circuit 80 in order to carry out the operations described by the flow charts of FIGS. 5–6.

The optical transceiver port 88 can be a commercially-available IR transceiver for transmitting and receiving IR signals according to the IrDA standard, such as part no. HRM1200L, available from Stanley Electronics, Inc. of Irvine, Calif.

In an alternative embodiment of the scanner 20, the optical transceiver port 88 is omitted and the IR LED 82 is instead used to transmitted decoded barcode data and the phototransistor 84 is used to receive ACK signals from a host during transmit mode operation. In this dual-use embodiment, the processor 86 is configured to modulate the IR LED 82 according to the IrDA standard and the barcode transmission format disclosed herein to effect transmission of the decoded barcode data to the host 40. The processor 86 is also configured to receive the ACK signals from the host 40 by way of the phototransistor 84.

The present invention is not limited to the circuit topology or components shown in FIG. 4. The functions of the circuit 80, including those of the processor 86, can be implemented using any suitable combination of hardware and software components, or one or more application specific circuits (ASICs), or any other custom or semi-custom device technologies for building electronic circuits that perform digital and/or analog processing.

Figure 5:
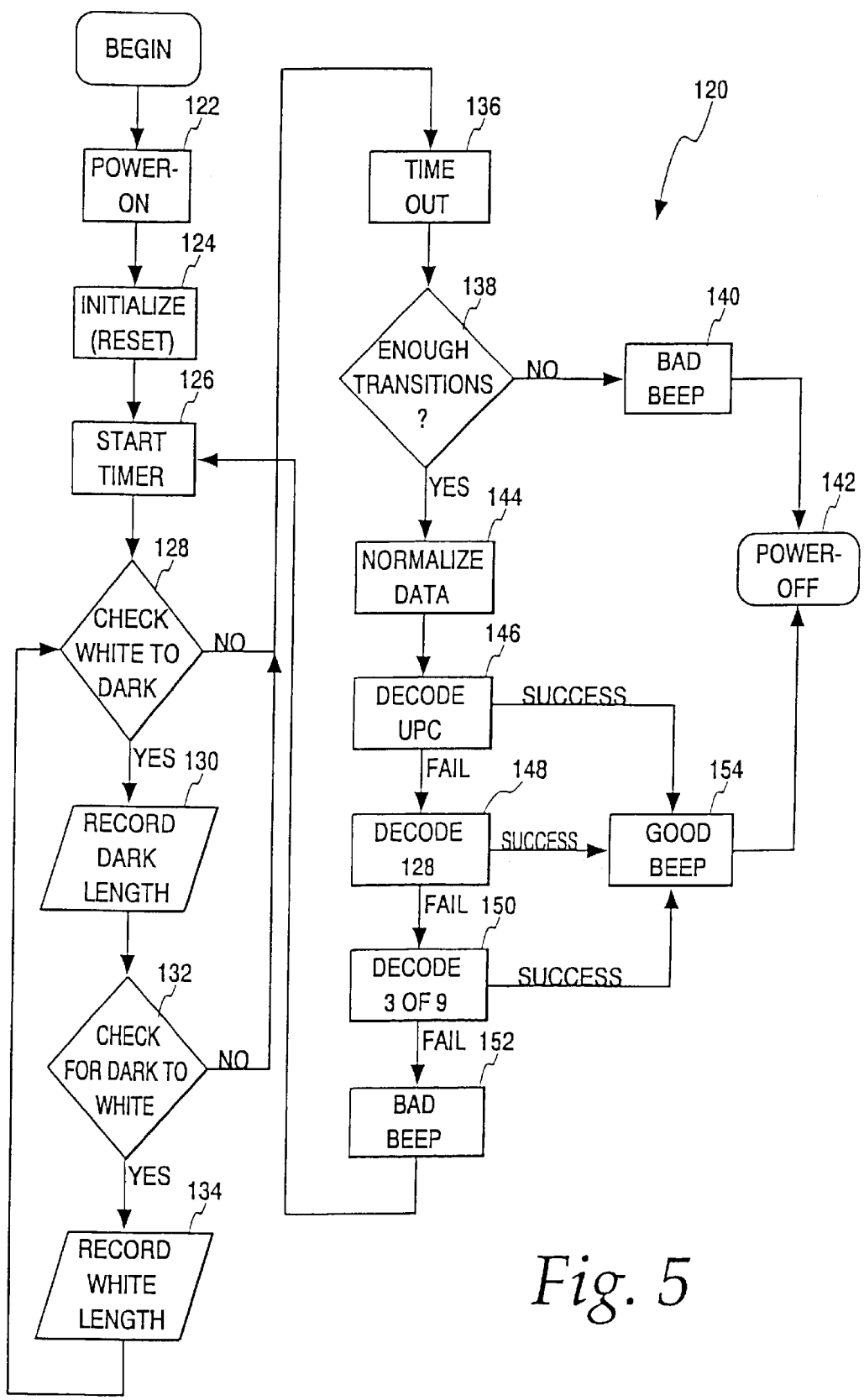
FIG. 5 is a flow chart diagram illustrating the scan operation of the optical scanner shown in FIGS. 1–3.

FIG. 5 illustrates a flow chart diagram 120 of the scanning operation of the scanner 20. In step 122, scanner 20 is powered-on into the scan mode by a user depressing the switch 90. This action provides the battery-supplied voltage the enable input (SHDN) of the voltage regulator 100 through a diode 104. The regulator 100 then powers up the processor 86. In addition to enabling the voltage regulator 100, the battery voltage is provided to a delay circuit 106, which provide a logic 'one' to an input of the processor 86. In response to this logic 'one', the processor 86 knows it is being powered up in the scan mode. In response, the processor 86 then outputs a logic 'one' signal to the diode 107 to maintain the voltage regulator 100 and in an enabled state. This results in the circuit 80 powering-up into a scan mode for reading barcode symbols.

In step 124, the processor 86 initializes the circuit and its internal registers. The processor 86 can be configured to scan, decode and store one barcode symbol per activation of the switch 90.

In step 126, the processor 86 starts an internal timer. The timer establishes a time-out period during which the scanner 20 can receive barcode data. It is during this time that a user can swipe the scanning. head 26 over a barcode symbol to successfully read it. If not barcode transitions are detected during this time-out period, the processor 86 sends a logic 'zero' to the diode 107 and powers down the circuit 80. Preferably, the time-out period is five seconds.

Prior to the expiration of the time-out period, the processor activates the LED 82 for illuminating scanning surfaces. The processor 86 then waits to determine whether a white-to-dark transition is detected by the phototransistor 84 (step 128). If no white-to-dark transition is detected during the time-out period, a time out occurs (step 136). However, if a transition is detected, the processor records the time length of the dark period, which is the amount of time between a white-to-dark transition and a subsequent dark-to-white transition (step 130). In step 132, the processor waits for a dark-to-white transition. If this transition does not occur within the time-out period, a time-out event happens (step 136). If the dark-to-white transition is detected, the processor 86 records the length of the white space in time (step 134). The process then returns to step 128 to check for a subsequent white-to-dark transition.

After the scanner 20 is moved over a barcode symbol and after the transitions are recorded, the time-out event occurs (step 136). After the time-out, the processor 86 checks to determine whether a sufficient number of transitions occurred within the time-out period (step 138). Typically, a sufficient number of transitions are detected when the transition count during a time-out period exceeds a predetermined threshold value. If an insufficient number of transitions is detected, the processor 86 issues a bad beep using the buzzer 96 (step 140). A bad beep can be a predetermined noise having a lower frequency than a good beep.

If a sufficient number of transitions is detected, the processor 86 normalizes the bar length data (step 144). The bar length data indicates the amount of time occurring between each of the transitions and thus indicates the length of a dark bar or white space occurring in the barcode symbol. Industry standard barcode symbologies delimit bar and space widths in standard units that are multiples of each other. Accordingly, the transition times can be normalized by first finding the minimum transition time, and then dividing all other recorded transition times by the minimum time. The result is rounded to the closest whole number. The bar widths usually have one, two, or three units of width.

After normalizing the lengths, the processor 86 successively applies each of a plurality of industry standard decoding algorithms to the normalized barcode data until the data is successfully decoded, or all of the algorithms fail to properly decode the barcode data. The algorithms can be applied in any order. As illustrated in the method 120, the processor 86 first attempts to decode the series of transitions as UPC (universal product coded) data. For each of the algorithms, the processor 86 attempts to decode the transitions presuming a forward scan. If the data is not decoded presuming a forward scan, the processor 86 attempts the decoding algorithm presuming a backward scan of the barcode symbol.

Each of the industry standard algorithms encodes data in a mutually exclusive format, minimizing the probability that data encoded according to one format will be mistakenly decoded as data in another format.

If the data is successfully decoded according to the UPC algorithm (step 146), the processor 86 generates a good beep (step 154), and then powers down the circuit 80 by issuing a logic 'zero' to the diode 107 (step 142). After the circuit 80 is powered down, a user can depress the scan switch 90 to read another symbol.

However, if the processor 86 fails to decode the scanned data as UPC, it next attempts to decode the data according to the 128 algorithm (step 148). If the data is successfully decoded according to this algorithm, the processor 86 issues a good beep (step 154) and then powers down the circuit 80 (step 142). However, if the 128 algorithm also fails, the processor 86 then applies the 3 of 9 decoding algorithm. If this algorithm fails to properly decode the data, the processor 86 issues a bad beep (step 152) and begins a new time-out period by restarting the timer (step 126). However, if the 3 of 9 algorithm successfully decodes the data, the processor 86 issues a good beep (step 154) and powers down the circuit (step 142).

Although the method 120 illustrates three industry standard decoding algorithms, the processor 86 can be programmed to decode scanned data by attempting any number of barcode algorithms, standard or proprietary.

Prior to powering down the circuit 80, the processor 86 stores successfully decoded data in a memory buffer for future transmission to a host, such as the host computer 40. In the circuit 80 shown, the memory buffer is an internal EEPROM included in the processor 86. In this arrangement, the buffer can store up to 128 scanned barcodes.

Figure 6:
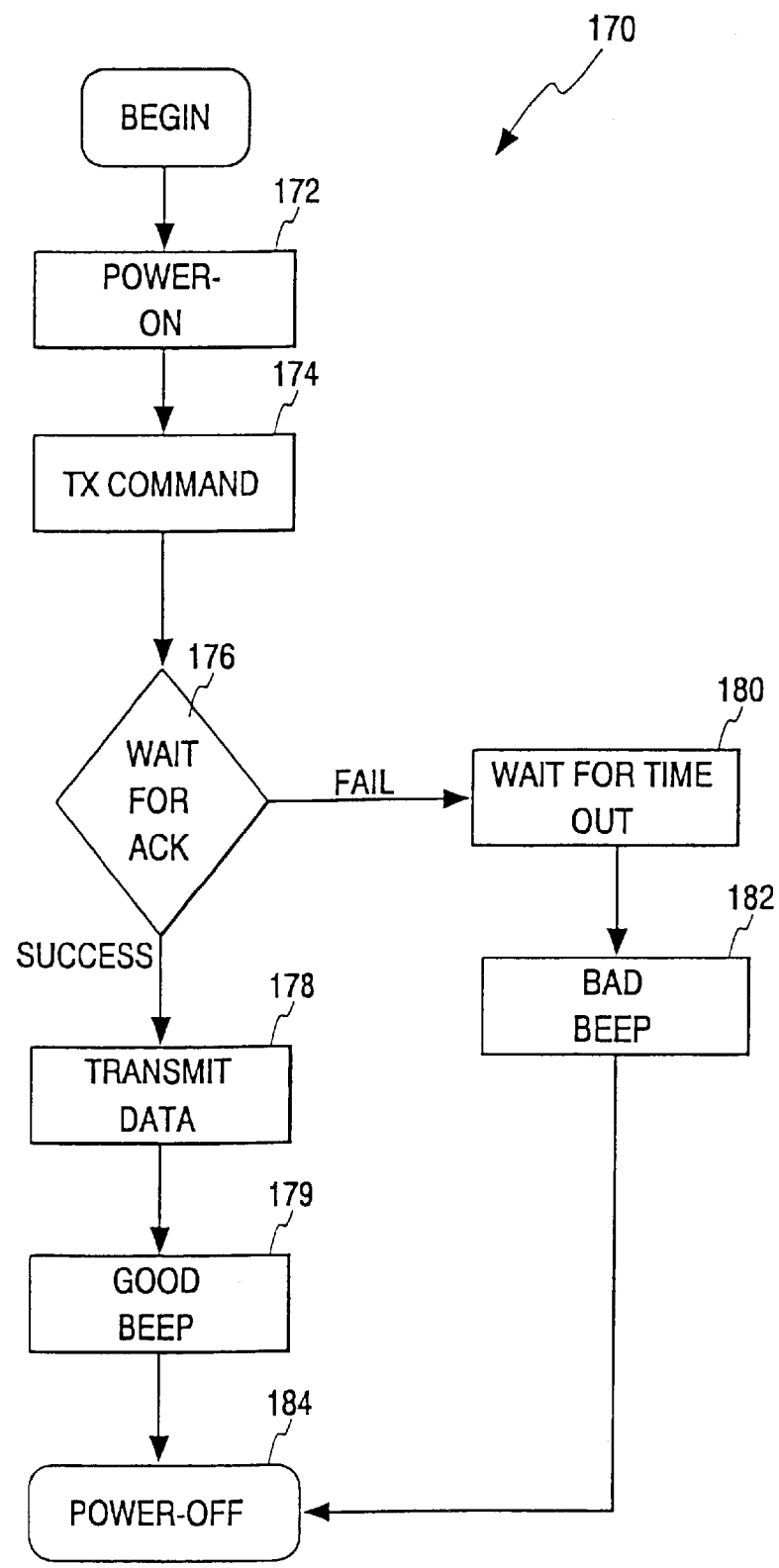
FIG. 6 is a flow chart diagram illustrating the transmit operation of the optical scanner shown in FIGS. 1–3.

FIG. 6 is a flow chart diagram illustrating a method 170 of transmitting the scanned barcode data to the host computer 40. The method 170 illustrates the transmit mode operation of the circuit 80.

In step 172, the circuit 80 is powered-on by depressing the transmit switch 92. The transmit switch 92 provides the battery voltage to the enable (SHDN) input of the voltage regulator 100. This causes the voltage regulator 100 to supply power to the processor 86. The processor 86 then powers-on and detects a logic 'zero' output by the delay circuit 106. A logic 'zero' indicates that the circuit 80 is powering-on in a transmit mode. The processor 86 then issues a logic 'one' to the diode 107 to hold the voltage regulator 100 in an enabled state for a predetermined time-out period.

In step 174, the processor 86 issues a transmit command to the host computer 40 by way of the optical transceiver port 88. The transmit command alerts the host 40 that the scanner 20 is going to transmit one or more packets of barcode data.

After transmitting the transmit command, the processor 86 waits for an acknowledgement (ACK) from the host. If an ACK is not received during the time-out period (step 180), the processor 86 issues a bad beep (step 182) and powers off the circuit 80 by issuing a logic 'zero' to the diode 107 (step 184).

However, if an ACK is received from the host 40 before expiration of the time-out period, the processor begins to transmit the decoded barcode data according to the barcode transmission format described above in connection with FIG. 2. The processor 86 can transmit each decoded barcode as a separate packet. Further, the processor 86 can sequentially transfer each of the decoded barcode stored in its memory until they are all transferred to the host 40. For each packet sent to the host 40, the scanner receives an ACK indicating whether the processor 86 is to delete the transmitted barcode from the internal memory of the scanner 20.

After successfully transferring the decoded barcode data, the processor 86 issues a good beep (step 179) and powers down the circuit 80 by issuing a logic 'zero' to the diode 107 (step 184).

FIG. 7 is a partial top sectional view of an optical head 198 that can be included in the optical scanner 20. The view shows the optical head 198 attached to the housing 201 of the scanner 20. The optical head 198 defines a compartment 203 that encloses an illuminator lens 204, an imaging lens 206, a photoemitter 208, a photodetector 210 with a pinhole aperture 212, and a dividing wall 202.

The wall 202 divides the compartment 203 into a first subcompartment 205 and a second subcompartment 207. As discussed above in connection with FIG. 3, the wall 202 reduces extraneous light reading the photodetector 210.

The optical scanning head 198 includes a cover 200 which is transparent to the frequency of light emitted by the photoemitter 208.

The photoemitter 208 is aligned with the optical axis 211 of the illuminator lens 204. The photodetector 210 and pinhole aperture 212 are likewise aligned with the axis 209 of the imaging lens 206.

The pinhole aperture 212 can be a metal or plastic plate placed in front of the photodetector 210 to cover all but a predefined area of the photosensitive area of the detector 210. The plate can be a separate drop-in unit, such as a flat square or rectangular shaped piece of metal or plastic, for attaching to the housing 201, or alternatively, it can be integrally formed within the housing 201 to provide a screen for limiting the amount of light reaching the photodetector 210. A hole 213 formed in the plate, having a predefined diameter, permits light to reach the photosensitive surface of the detector 210.

The hole 213 formed in the pinhole aperture can be cylindrical or conical in shape. In a cylindrical configuration, the diameter of the hole can be a value between 0.25–2.0 mm. In the conical arrangement shown, the center of the hole can be aligned with the optical axis 209 of the imaging lens 206, with the wider end of the cone opening toward the imaging lens 206 and the smaller end of the cone opening toward the photosensitive area of the photodetector 210. Although the diameters of the openings can be any suitable value for improving the resolution, the wider opening of the hole 213 can be 1 mm, while the smaller opening can be 0.25 mm in diameter. The pinhole aperture 213 improves the image resolution of the optical system included in the scanning head.

Figure 8:
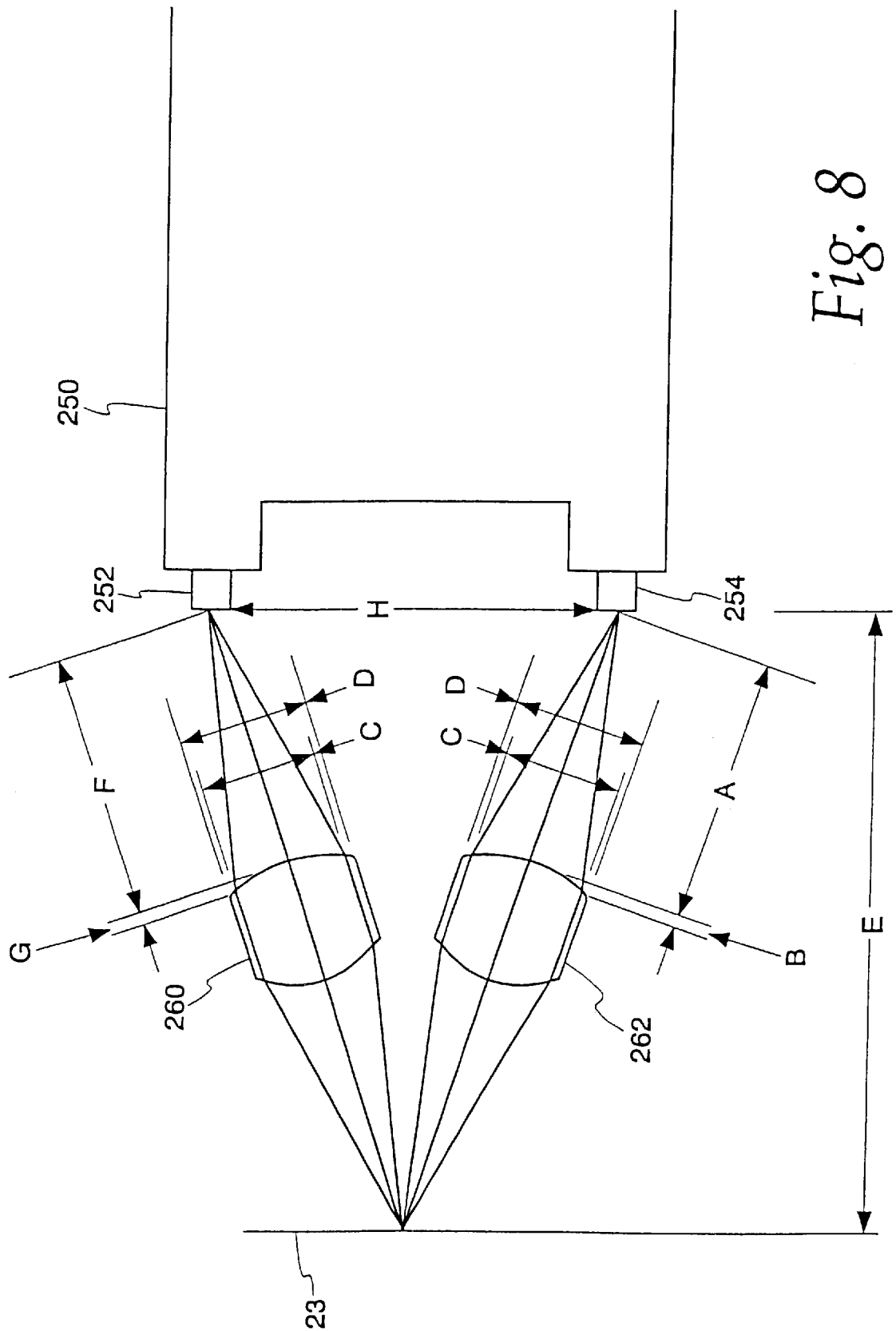
FIG. 8 is a light path sectional view of the optical scanner of FIGS. 1–3.

FIG. 8 is a light path sectional view of the optical scanner head. A circuit card 250 carries a photoemitter 252 and a photodetector 254. In the configuration shown, the photoemitter 252 and photodetector 254 are not aligned with the illuminator and imaging lenses 260, 262 optical axes. However, the arrangement of the optical elements 260, 262 and dimensions illustrated in FIG. 8 can be applied to either aligned or non-aligned photoemitter and photodetector devices.

The lenses 50, 54, 204, 206, 262 as described herein can each have a magnification of 1 to 1.2. The dimensions of the optical system shown in FIG. 8 are given in the table below.

| Parameter | Code | Value (mm) |
| --- | --- | --- |
| Distance Phototransistor to first vertex of Imaging Lens | A | 4.202 |
| Sag to clear aperture (CA) of Imaging Lens | B | 0.1883 |
| Diameter of CA of Imaging Lens | C | 1.8 |
| OD of Imaging Lens | D | 2.2 |
| Distance from Phototransistor to Bar Code Surface | E | 10 |
| Distance LED to first vertex of Illuminator Lens | F | 4.202 |
| Sag to CA of Illuminator Lens | G | 0.1883 |
| Diameter of CA of Illuminator Lens | C | 1.8 |
| OD of Illuminator Lens | D | 2.2 |
| Distance from LED to Bar Code Plane | E | 10 |
| Distance between Photodetector and Photoemitter | H | 5.8 |

In FIGS. 9 and 10, a second embodiment of a hand-held barcode scanner 500 in accordance with the invention is shown. This embodiment incorporates a housing 550, and an optical scanner head 300 that is operated by the control buttons 680 and 710 in accordance with the invention. The scanner head 300 and the control buttons 680, 710, are operatively connected to a printed circuit card that is not shown here for clarity reasons. The printed circuit card is identified as reference character 900 in FIGS. 23 and 24. The optical scanner head 300 and other associated electronic components are contained within the two-piece housing 550, which includes a top piece 554 and a bottom piece 552. The housing 550 has a front 556, a back 558, and the opening 560. When the two pieces 552, 554 are connected together, the opening 560 presents a peripheral champhered front surface for receiving a complementary interior undercut surface 752 of front cover 750. The front cover 750 is contacted against indicia to be scanned and read. The control buttons 680 and 710 control the operating function of the optical scanning head 300, as well as the data storage and transfer functions of the scanner device.

The optical scanner head 300 shown in FIG. 10 represents a first embodiment comprising a two-piece housing having a body portion 304 connected to the lid portion 302. In FIGS. 11–13, it is seen that a two-piece housing would include the top surface 306, the bottom surface 308, the front surface 310, and the back surface 312. An opening 320 is formed in the front surface 310 to allow the transmission and reception of light signals to and from the optical scanner head 300. It also seen that the first angled side surface 314 and the second angled side surface 316 interconnect the front 310 and back surfaces 312. In FIG. 12, it is seen that the back surface 312 includes the series of spaced, rectangular openings 318A–318D which feed the four protruding metal leads (see FIG. 10) from inside the optical scanner head 300, outwardly to a circuit card (not shown).

In FIGS. 11 and 14, two versions of the body portion 304 of the optical scanner head 300 are shown. In FIG. 11, the body portion 304 is formed from a base foundation 330 and the upwardly projecting angled sidewalls 402, and 404 extending from surface 332. The first angled side wall 402 has a top surface 406, while the second angled side wall 404 has a top surface 408. The surface 332 includes an indentation 410 extending between sidewalls 402 and 404, parallel to the front surface 331. The indentation 410 forms a part of a connection mechanism between pieces 302 and 304, as will be explained shortly hereafter.

The foundation 330 is also seen to include the first pathway 334 and the second pathway 364. Either pathway 334, 364 can be dedicated as a light-receiving or a light-discharging pathway. In this embodiment, pathway 334 will serve as the light-discharging pathway. The surfaces 335, 365 which define each pathway (see FIG. 13) may be semi-circular in cross-section, although any cross-sectional shape such as a square, rectangular, oval, etc., can be used as long as the shape does not interfere with the path of travel of the light. Advantageously, the pathway surfaces 335 and 365 do not require precision machining as do prior art devices. The light-discharging pathway 334 has a front end identified at 336 and a rear end identified at 338. The front end 336 begins at the front surface 331, and extends towards the back surface 333, where it adjoins to the first pocket 342. As seen in the illustration, the first pathway 334 generally extends parallel to the angled sidewall 402.

The first pocket 342 may comprise a rectangular slot or cell cut into the foundation 330, and in this instance is seen to include the front wall identified at 334, the sidewalls 346 and 348, and the floor 352. An elongated back wall 350 may be provided, although in the other adaptation of the two-piece embodiment shown in FIGS. 14 and 16, the back-wall is not provided. However, a portion of the foundation 330 identified at 350S functions like a wall, as will be explained shortly hereafter. The rear end 338 of pathway 334 is seen to intersect at the center of the front wall 334 such that the first pathway 334 communicates with the first pocket interior 343. It is also seen that a photo axis 356 dissects the first pathway 334, and is aligned with the upstanding pin 354 that projects upwardly from floor 352 inside pocket 342. When the elongated back wall 350 is provided in body portion 304, a portion of the wall 350 immediately adjacent the side walls 346 and 348 of the pocket 342 is removed to form the openings 318A and 318B in the back surface 312 of the optical scanner head 300, as shown in FIG. 12. The openings 318A and 318B are in communication with the pocket interior 343. In the adaptation shown in FIGS. 14 and 16, the openings 318A and 318B meld into a single rectangular opening 318AB.

As the illustration also shows, the front end 336 of the first pathway 334 is provided with the recess 340 which is disposed so that the photo axis 356 will be perpendicular to a face 341 of the recess 340. The recess 340 may be rectangular or circular in shape and may extend into the foundation 330 to a deeper level than that of the surface 335 in order to securely hold a focusing lens (FIG. 17) and to ensure that the focal axis of the lens will be aligned with the photo axis 356.

The body portion 304 also includes a second pathway 364 that is formed into foundation 330 and this pathway is substantially identical to the first pathway 334. Like the first pathway 334, the second pathway 364 includes the front end 366, the rear end 368 and the surface 365, which is also shaped into a semi-circular configuration. The second pathway also includes the rectangular shaped recess 370 that is located towards the front end 366 of the second channel 364. The second channel 364 adjoins with a second pocket 372 that is comprised of a front wall 374, sidewalls 376 and 378, a floor 382 and a back wall 380. The front wall 374 may also include an indentation 375 which will be explained below. Like the first pocket 342, an elongated back wall 380 may or may not be provided. Here, the elongated back wall 380 is provided, and similar openings 318C and 318D are formed in the back surface 312 of the optical scanner head 300. The openings 318C and 318D communicate with pocket interior 373. In the adaptation shown in FIGS. 14 and 16, the openings 318C and 318D meld into the single opening 318CD. The second pocket 372 is seen to also include an upstanding pin 384 that is aligned with the photo axis 400 of the second pathway 364. The orientation of the second pathway and the second pocket 364, 372, is identical to that of the first pathway 334 and the first pocket 342. The first and second pathways are disposed at angle with respect to each other, wherein the angle forms a predetermined focal point position of the optical scanner head which is important to the operation of the scanner device. The focal point position of the present optical scanner head 300 is chosen to be outside the body portion 304, adjacent front surface 310.

One noted difference between the first and second pathways 334, 364 is that the rear end 368 of the second pathway 364 is formed with a gradually tapering or decreasing cross-section which forms a pinhole-sized opening 390 that is about 0.25 mm in diameter and which is in communication with the second pocket interior 373. The pinhole-sized opening 390 is considered to be a part of a pinhole aperture 392 that is provided within the second pathway 364. In another embodiment, the pinhole aperture 392 may also include a second component identified at 394 in FIG. 17. The second component may be a metallic or plastic plate 394 that is provided with a hole 396 which is aligned with the pinhole-sized opening 390. The hole 396 is formed to have a conical cross-section through the thickness of plate 394, where the opening on the side of the plate facing the channel 364 has a diameter of about 0.25 mm, while the opening on the other side of the plate 394 has a diameter of about 0.10 mm. The front wall 374 is provided with an indentation that is delimited by wall 375. The plate 394 is inserted into the indentation and against wall 375 with the side having the 0.10 mm opening contacting side 417F of the photodetector 425. The pinhole-sized opening 390 and the hole 396 will be axially aligned with each other. In an embodiment where the plate 394 is not provided, the front wall 374 will still include the indentation, and the pinhole-sized opening 390 will be aligned directly with the photo axis 400, which as mentioned, is aligned with the upstanding pin 384.

As FIG. 17 illustrates, an illuminator or photoemitter 415 is provided within pocket 342. The photoemitter includes the major sides 417 and the minor sides 419, wherein the major sides 417F and 417B are held respectively against the front wall 344 and pin 354 when inserted into the pocket 342. The minor sides 419 do not contact against the sides of the pocket so that the wire portion 421A can be threaded into opening 318A, while the wire portion 421B can be threaded through opening 318B. With the embodiment of the body 304 shown in FIGS. 14 and 16, the wire portions 421A, 421B extend through the single rectangular opening 318AB.

FIG. 17 also illustrates that the second pocket 372 will receive a photodetector 425. The photodetector major side 427B will contact the pin 384. In an embodiment where the pinhole aperture includes the plate 394, the plate contacts wall 375 and the major side 427F will contact the entire backside 394B of the plate, as is shown. If the plate 394 is not provided, the major side 427F contacts the wall 375 that defines the indentation formed within the front-wall 374. The photodetector sidewalls 429 do not contact the sidewalls of the pocket so that the wire portion 431A can be threaded through the opening 318C, while the wire portion 431B can be threaded through the opening 318D. If a single rectangular opening 318CD is provided (FIG. 16), then metal leads 431A, 431B extend through the same opening. The photoemitter 415 and photodetector 425 are disposed within the pockets 342, 372 so that the respective photo axes 356, 400 of the first and second pathways 334, 364, will be perpendicular to the respective front faces 417F, 427F.

As FIG. 17 also shows, a light-focusing lens 435 and 439 is received within each respective recess 340 and 370. Advantageously, the lenses can be injection molded of a plastic material on a mass production basis. The lens 435 includes the face 437 that is disposed perpendicular to the photo axis 356 when inserted into the recess 340. Likewise, the face 441 of lens 439 will be disposed perpendicular to the photo axis 400 of the second channel 364.

In yet another embodiment of the optical scanner head, a filtering plate 444 may be provided in the second pathway. As FIG. 17 shows, the filtering plate can be located midway between the focusing lens 439 and the pinhole-sized opening 390. The filtering plate 444 is received within a groove 442 formed into surface 332 (see FIG. 11). The groove 442 may be rectangular in shape and should be disposed so that the photo axis 400 will be perpendicular to a face 445 of the plate 444. The filtering plate 444 is provided with an aperture 447 having a uniform diameter of about 1.1 mm. The filtering plate 444 functions as a first mechanism for preventing unwanted stray or incident light from reaching the photodetector 425.

Referring to FIG. 15, an embodiment of the lid portion 302 which may be used in accordance with the optical scanner head 300 will now be described in greater detail. Generally, the lid portion 302 is configured to be complimentary to the shape of the body portion 304 so that when the two portions 302 and 304 are connected together, the lid portion 302 will be received in between the angled walls 402 and 404 and will not extend above the surfaces 406 and 408 (see FIG. 12). Likewise, when the lid portion 302 is assembled into the body portion 304, the front end surface 367 of the lid portion 302 and the front surface 331 of the body portion 304 will be coextensive to each other and collectively form the front surface 310 of the optical scanner head 300 (see FIG. 13). The back end surface 333 of body portion 304 and the back end surface 369 of the lid portion 302 will be coextensive to each other when the two portions are connected together, collectively forming the back surface 312 of the optical scanner head 300 although this feature is not apparent in the figures.

The lid portion 302 is generally defined by the base foundation 450 which includes a first angled sidewall 456 having a surface 457, and a second angled sidewall 458 having a surface 459 (see FIG. 10). In this embodiment, a first and second pathway 334' and 364', and a first and second pocket 342' and 372' are formed into surface 452 the base foundation 450. The pathways 334' and 364' and pockets 342' and 372' are complementary to the pathways 334, 364 and pockets 334, 364 of body portion 304, except that pockets 342' and 372' are provided with holes 464 and 474 instead of pins. When lid portion 302 is connected with the body portion 304, the hole 464 will receive the upstanding pin 354 and the hole 474 will receive upstanding pin 384. The pocket 372' will also include the indentation 375' and may also include a rectangular groove 442' in an embodiment where the filtering plate 444 is provided.

The lid portion 302 may be provided with a protuberance 480 that extends between the angled sidewalls 456 and 458. The protuberance 480 is designed to snap-fit within the indentation 410 of the body portion 304 to hold the two portions together. Thus, the pins 354, 384 and holes 464, 474, as well as the protuberance 480 and indentation 410 collectively form a connection device for holding the portions 302, 304 of the optical scanner head 300 together, although other means can be used such as sonic welding or gluing.

As seen in FIG. 18, when the two portions 302 and 304 are assembled together, the respective first and second pathways 334', 364', and 334, 364 of the lid and body portions 302, 304, will form the first and second cylinders 494 and 504 within the optical scanner head 300 (only cylinder 504 can be seen). The respective cylinders 494 and 504 form enclosures that maintain a light-tight separation between the photoemitter and photodetector during operation, thereby increasing the precision of the optical scanner head 300. Likewise, the first and second pockets 342', 372', and 342, 372 of the lid and body portions 302, 304 will form the first and second chambers 522 and 532 (only chamber 532 can be seen). The first cylinder 494 and first chamber 522 will receive the photoemitter assembly, which is comprised of the photoemitter 415 and the light-focusing lens 435. The second cylinder 504 and second chamber 532 will receive the photodetector assembly, which is comprised of the photodetector 425, the light focusing lens 439 and a filtering plate 444, if provided. The photodetector assembly further includes the pinhole aperture, which may include the plate member 394.

In operation, the photoemitter 415 operates by emitting a beam of light that is directed along the photo-axis 356 of the first pathway 334 and through the focusing lens 435, before being discharged through the opening 320. The lens 435 focuses or concentrates the light beam emitted by the photoemitter 415 onto a scanning surface outside the optical scanner head 300. The light emitted from opening 320 is directed onto a bar code indicia to be scanned. The emitted light that strikes the indicia is reflected back towards the optical scanner head 300, where it re-enters opening 320, and is directed into second pathway 364. The reflected beam is further concentrated by passing it through the focusing lens 439. The focusing lens 439 is an imaging lens that focuses all light reflected from the scanning surface. However, the light beam exiting the lens 439 may include unwanted incident or stray light. To address this concern, the beam of light is further passed through the filtering plate 444 and then through the pinhole aperture 390 so that only the light representing the scanned indicia will pass to the photodetector 425. Favorably, each of the focusing lenses 435 and 439 can be manufactured from low cost polycarbonate (clear plastic) and made to focus at the point intersection between the photo axes of the first and second pathways, which is predetermined to be near the contact point with a scanning surface, which in at least one embodiment is immediately outside opening 320.

In FIGS. 19 and 19A, the bottom piece 552 of the housing 550 are described in greater detail. The bottom piece 552 is comprised of a unitary member having a front surface 562 that is champhered for receiving the cover 750, as was previously described, and a back surface 564 that is in the form of an extended shelf. The back surface 564 includes a pair of laterally displaced short stubs 566 and the large hole 568. The single sweeping wall 570 gives the bottom 552 a shell-like configuration having an interior 571 and an interior surface 575, as best seen in FIG. 10. Disposed within the interior 571 is the first upstanding sidewall 572 which includes a top ridge 574. Laterally displaced from the first upstanding sidewall 572 is the second upstanding sidewall 578 which also includes a top. perimeter ridge 580. In FIG. 19A, it is seen that sidewall 572 also includes a recess 576 formed below the top perimeter ridge 574. Although it cannot be seen in FIG. 19A, it should be understood that sidewall 578 is provided with an identical recess 582.

The top ridge and recess, 574, 580, and 576, 572 on the first and second upstanding sidewalls 576 and 578 function as a connection device where the top piece 554 snap-fits into the recesses onto the bottom piece 552. The short stubs 566 on the back surface 564 also function as a connection device between the top 554 and bottom 552 pieces, as will become clearer after details of the top piece 554 are provided.

Disposed within the interior 571 and connected to the surface 575 is a first post 584 that includes the upstanding pin 586 and the bridge member 588. Likewise, an opposed second post 592 includes an upstanding pin 594 and a bridge member 596. The bridge members 588 and 596 are integrally connected to a first and smaller C-shaped support bracket 590. A larger, C-shaped support bracket 598 is longitudinally displaced from the smaller C-shaped bracket 590 and is disposed such that the open portion of each of the C-shaped brackets face each other. In between the C-shaped support brackets 590 and 598 are the first and second inverted. L-shaped brackets 600 and 602. The inverted L-shaped brackets are identical to each other and arranged in opposite facing directions. Each bracket is comprised of a first upstanding leg 604 and a second leg 606.

The pairs of C-shaped brackets 590, 598, and the inverted L-shaped brackets 600, 602, form a retention device for a replaceable power source. It is believed that no other optical barcode scanning device has been powered by a replaceable power source, therefore that feature is an important aspect of the present invention. In this embodiment, the replaceable power source can comprise two replaceable batteries 800 that are held in place between the C-shaped support brackets 590, 598, and the inverted L-shaped brackets 600, 602, with the leg 606 snap-fitting the batteries in place (see FIGS. 23 and 24). The upstanding pins 586 and 594, project to support a printed circuit card 900 (FIGS. 23 and 24) that is to be received within the interior of the top piece 554.

Referring to FIGS. 20 and 20A, the top piece 554 of the housing 550 will now be described. The top 554 is also formed from a single sweeping wall 620 which forms a second shell-like member having an interior 621, the front champhered surface 610, and the back surface 612 which integrally connects with the side shelf surfaces 614. The back surface 612 includes the pair of laterally displaced holes 616 and the large hole 618 interposed therebetween. The side shelf surfaces 614 include identical first and second upstanding walls 622 and 623. The wall 622 has an outside surface 624 and the inside surface 626. The outside surface 624 is configured with an arcuate cross-sectional configuration and includes a generally rectangular shaped recess 625 (see FIG. 20A). The inside surface 626 faces the interior 620 of the bottom 554 and is seen to be substantially planar. The second upstanding wall 623 includes identical features, therefore it will not be described in greater detail.

The sweeping wall 620 further includes an undercut through a portion of the interior 621 to form an intermediate surface 628. The portion of the sweeping wall 620 in between the surface that forms top shelf 614 and intermediate surface 628 includes a miniature ridge 632 that extends substantially between the front and back surfaces 610, 612. See FIG. 20A also. The intermediate surface 628 is further undercut to form a floor surface 630. The floor surface 630 undercut still further to form basement surface 632 which is seen to include a first pair of upstanding pins identified at 638 and a second pair of upstanding pins identified at 640.

The basement surface 632 also includes an oval-shaped hole identified at 642 and a tadpole shaped hole identified at 644. A front tip 646 of the tadpole shaped hole 644 is coextensive with an area of transition between the floor surface 630 and the basement surface 632.

The top piece 554 may include a first hold down bracket 648 which has a top wall surface 650, a bottom wall surface 652 (see FIG. 25), a back wall surface 654, a planar sidewall surface 656, and an angled sidewall surface 658. An identical second hold down bracket 660 is laterally spaced from the first hold down bracket 648 and it includes the wall surface 662, the bottom wall surface 664 (see FIG. 25), the back wall surface 666 and the two sidewall surfaces 668 and 670. The respective lowermost portions of each angled sidewall surfaces 658 and 670 are integrally formed into the side shelf surfaces 614, and as seen by the dashed lines, each bracket 648, 660 is arranged such that a greater portion of the bracket extends beyond an edge of the side shelf surfaces 614. As the figure further illustrates, each hold down bracket 648, 660 is generally arranged between the front surface 610 and the point of transition between the floor surface 630 and the basement surface 632. The first and second hold down brackets 648, 660, function to retain and position the optical scanner head 300 adjacent the opening 560.

In another embodiment, the two individual hold down brackets 648, 660 may instead be replaced with a single integral bracket 648P that extends across the interior 620, as shown in dashed-line form in FIG. 20. In this embodiment, the integral bracket 648P would form a cover for the body portion 304 so that a lid portion 302 would not be required.

A first and smaller control button identified at 680 in FIG. 22 is inserted into the oval-shaped hole 646 of the top piece 554. The small control button 680 includes the planar bottom surface 684 and the undercut top surface 682 which forms the perimeter ledge 686. The perimeter ledge 686 is generally uniform in width except for the narrowed area as shown. Integrally formed with the main body of the button 680 is the first leg identified at 688 and the second leg identified at 690. The first and second legs are identical and include first ends 692 and second ends 694. The legs 688 and 690 are generally parallel to each other and are interconnected together by the cross arm 696 which is formed with the bosses 698 and 700. Each boss 698, 700 includes a respective hole 699 and 701, which are identical in diameter. When the small button 680 is inserted into the oval-shaped hole 642, the upstanding pins 638 are received within holes 639 and 641, while the perimeter ledge 686 abuts against the floor surface 630 of top piece 554. The top surface 682 of the button 680 projects through the hole 642 and is presented to a user of the device. The bottom surface 684 includes the post 702 which has a surface 704 that contacts an electrical switch mechanism (not shown) on the printed circuit card 900 (see FIGS. 23 and 24), when the small control bottom 680 is depressed. The small button 680 will be arranged in close proximity between the legs of the large button 710, which will now be described.

Referring to FIG. 21, the large control button identified at 710 is shown having a shape that is complementary to the shape of the tadpole-shaped hole 644 formed in top piece 554 for insertion therein. The large control button 710 includes a planar bottom surface 714 and an upper planar surface 712 which is undercut to form a perimeter ledge 716. A front of the control button 710 is formed so that the perimeter ledge 716 and the top surface 714 include a generally straight edge section 718 that is disposed generally perpendicular to the longitudinal axis L. The perimeter ledge 716 will contact the floor surface 630 of the top piece 554 when inserted into the hole 644, and the outside surface 712 will be presented to a user-operator of the device. The bottom surface 714 includes the post 735 which has a surface 736 that contacts an electrical switch mechanism (not shown) on the printed circuit card 900 (see FIGS. 23 and 24), when the large control button 710 is depressed. As seen, the large button 710 includes the identical first and second legs 720, 736. Each leg 720, 736 has a first end 722 and a second end 724. The first leg 720 is formed with short stub section 726 integrally attached to a main body of the button 710 and with the angled section 728. The angled section 728 is integrally attached to the long section 730, which terminates at the boss 732 and which includes the hole 734. Likewise, the second leg 736 is seen to include the short stub section 738, the angled section 740, and the long section 742, as well as the boss 744 and hole 746. When the large button 710 is inserted within top piece 554, each leg 720 and 736 is secured to a respective upstanding pin 640 by inserting the pin 640 into the respective hole 734, 746 on each boss 732, 744. It is important to note that when the large button 710 is attached to the pins 640, the straight front edge 718 is substantially arranged at the point of transition between the floor surface 630 and the basement surface 632.

When assembling the hand-held barcode scanner device of the present invention, the optical scanner head 300 will first be inserted within top piece 554 by sliding the optical scanner head 300 underneath either the two hold down brackets 648 and 660, or the single bracket 648P. The top surface 306 of the optical scanner head 300 will closely contact the bottom surfaces 652 and 664 of each hold down bracket 648, 660, or the unitary bottom surface 652P of the single hold down bracket 648P.

Likewise, the bottom surface 308 of optical scanner head 300 will closely contact the floor surface 630. Front surface 310 will be positioned adjacent the front champhered surface 610, while the back surface 312 will be generally aligned with the point of transition between the floor surface 630 and the basement surface 632. The angled side surfaces 314 and 316 of optical scanner head 300 frictionally contact an interior surface of sweeping wall 620 between the intermediate and floor levels. The optical scanner head 300 is generally prevented from longitudinal movement within the top piece 554 because of the frictional contact.

After the optical scanner head 300 is positioned underneath the hold down brackets 648, 650 (or bracket 648P), the large control button 710 is then inserted into top piece 554 such that the front straight edge 718 will contact the back surface 312 on the optical scanner head 300. This contact ensures that the optical scanner head 300 will not disengage from the hold down bracket(s) in a longitudinal direction. After the optical scanner head 300 and the large control button 710 are secured within top piece 554, the small control button 680 is then inserted. The top piece 554 is then ready to receive the circuit card 900 (FIGS. 23 and 24) that contains the electronic circuitry and components for operating the scanner device 500 of the present invention. The circuit card 900 is designed to rest upon the top shelf 614, and be frictionally secured against the planar inside surfaces 626 of each wall 622, 623. The upstanding pins 586 and 594 on bottom piece 554 will also function to hold the circuit card 900 within the bottom piece 554. The wires 421 and 431 extending out of the optical scanner head 300 connect to the circuit card 900 by either soldering or by plug-in connectors.

The bottom piece 552 is secured to top piece 554 by aligning the short stubs 566 on bottom piece 552 with the holes 616 on top piece 554. Further, the top perimeter ridges 574 and 580 that are formed in the first and second upstanding sidewall 572, 578 on bottom piece 552 are snap fitted within the respective recesses 625 formed within the first upstanding arcuate wall 568 and second upstanding arcuate wall 569 on top piece 554. When the bottom piece 552 and top piece 554 are secured together, the front 556 of the scanner device 550 presents a continuous champhered peripheral edge onto which a transparent cover 750 is snap-fitted or frictionally fitted. Accordingly, interior 752 of cover 750 includes an undercut 754 that is complimentary to the champhered edge formed about the front 556 of scanner 550.

In operation, the large control button 710 functions as a manual switch to power the electronic circuitry and to start the scanning operations. Likewise, the small control button 680 functions as a second manual switch to shut off the scanning operation and to begin the transmitting operation of the scanned information. Additionally, the small control button 680 can be used to delete the scanned information before it is transmitted. Accordingly, the operation of this embodiment of the scanner head 300 and the scanner device 550 is identical to the operation as described earlier with the previously described embodiment. Therefore, a detailed operating description will not be provided.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the apppended claims, and all changes that come within the meaning and range of equivalents are intended to be embraced therein.

We claim:

1. An optical scanner head for use in a scanner device, comprising:
    a body portion including a first pathway to discharge light and a second pathway to receive light, the second pathway disposed at an angle from the first pathway, wherein the angle forms a predetermined focal point position of the optical scanner head;
    wherein light discharged from the first pathway is isolated from the second pathway, the first and second pathways forming a centralized opening, comprised of side-by-side holes, in a front face of the optical scanner head;
    wherein each pathway is configured with an identical cross-sectional shape, the shape chosen from the group consisting of circular, oval, and of a geometry having at least three sides;
    wherein each of the pathways have corresponding front and rear ends, the front ends disposed alongside each other and the rear ends disposed laterally from each other;
    wherein one pathway and an adjoining pocket is adapted to receive the photoemitter assembly and the other pathway and an adjoining pocket is adapted to receive the photodetector assembly; and
    wherein each pathway and adjoining pocket is identical, each pocket having a respective upstanding, centrally disposed pin projecting from the floor that is aligned with the photo axis of the respective pathway.

2. The optical scanner head of claim 1, wherein each pathway includes a respective photo axis, and wherein the predetermined focal point position is located outside the body portion where the photo axes intersect.

3. The optical scanner head of claim 1, wherein each pathway is adapted to receive one of a photoemitter assembly to generate and discharge light and a photodetector assembly to receive and detect light.

4. The optical scanner head of claim 3, wherein the first and second pathways are enclosed by a lid portion.

5. The optical scanner head of claim 1, wherein the rear ends of the first and second pathways adjoin to respective pockets, wherein each pocket includes at least three walls intersecting with a floor.

6. The optical scanner head of claim 1, wherein the pin and at least one wall of each pocket is adapted to frictionally retain one of the photoemitter and photodetector assembly.

7. The optical scanner head of claim 1, wherein the rear end of the pathway adapted to receive the photodetector assembly includes a pin head aperture integrally formed therein.

8. The optical scanner head of claim 7, wherein the pin head aperture is comprised of a section of the pathway being formed with a continuously decreasing cross-section, wherein the continuously decreasing cross-section terminates with a pinhole opening that is in communication with the pocket.

9. The optical scanner head of claim 8, wherein the pin head aperture further includes a plate inserted inside the pocket, the plate provided with a second pinhole that is in axial alignment with the pinhole aperture and photo axis of the photodetector pathway.

10. The optical scanner head of claim 1, wherein the front ends of the pathways are adapted to receive a respective light focusing lens therein, the light focusing lens and photoemitter forming the photoemitter assembly, the light focusing lens and photodetector forming the photodetector assembly.

11. The optical scanner head of claim 10, wherein each pathway is provided with a respective recess to receive the light focusing lens therein.

12. The optical scanner head of claim 10, wherein the photodetector assembly further includes a light filtering plate disposed in the photodetector pathway, midway between the light focusing lens and the pinhole aperture.

13. The optical scanner head of claim 12, wherein the photodetector pathway is provided with a rectangular groove for receiving the filtering plate therein, the groove having a face which is disposed perpendicular to the photo axis.

14. The optical scanner head of claim 1, wherein each respective pocket formed in the lid portion includes a hole formed therein, the hole in vertical alignment with a pin, wherein insertion of the pin into the hole snap-fits the top and bottom portions together.

15. The optical scanner head of claim 14, wherein the top and bottom portions comprise injection molded members.

16. A scanner device comprising:
    a housing formed of a top piece connectable to a bottom piece, a front of the housing including an opening in communication with an interior of the housing;
    an optical scanner head received within the interior of the housing;
    an attachment assembly for holding the optical scanner head adjacent the opening; and
    a manual operator push button, the push button disposed within the interior behind the optical scanner head and having a front ledge surface that abuts a back end of the optical head scanner, thereby preventing longitudinal movement of the optical scanner head.

17. The scanner device of claim 16, wherein the optical scanner head is removably insertable within the attachment assembly.

18. The scanner device of claim 17, wherein the attachment assembly is comprised of at least one hold-down bracket, extending across the interior of the housing near the opening.

19. The scanner device of claim 18, wherein the optical scanner head is received under the at least one hold-down bracket, in close contact with a bottom surface of the bracket and a side wall and bottom wall of the housing.

20. The scanner device of claim 19, wherein a front face of the optical scanner head is generally coextensive with a front surface delimiting the opening of the housing, and a back face of the optical scanner head extends longitudinally beyond a rear surface of the at least one hold-down bracket.

21. The scanner device of claim 20, wherein the at least one hold-down bracket prevents the optical scanner head from vertical movement.

22. The scanner device of claim 21, wherein the attachment assembly is comprised of a first and a second hold-down bracket, each bracket laterally spaced from the other and attached along a respective side of the opening.

23. The scanner device of claim 16, wherein the connection device comprises a male and a female portion, the male portion comprising a pair of projecting ridges and a pair of projecting ridges and a pair of stub pins and the female portion comprising a pair of recesses and a pair of holes, the holes for receiving the stub pins therein and the recesses for receiving the projecting ridges therein.

24. The scanner device of claim 23, wherein the stub pins are laterally spaced from each other and disposed at the back of the housing, and wherein each projecting ridge is disposed along a respective side of the housing.

* * * * *